(12) United States Patent
Paweletz et al.

(10) Patent No.: US 9,816,572 B2
(45) Date of Patent: Nov. 14, 2017

(54) MACHINE TOOL DECELERATION DEVICE

(71) Applicant: Robert Bosch GmbH, Stuttgart (DE)

(72) Inventors: Anton Paweletz, Fellbach (DE);
Sebastian Laber, Steinenbronn (DE);
Florian Esenwein,
Leinfelden-Echterdingen (DE);
Manfred Lutz, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 14/407,954

(22) PCT Filed: Apr. 15, 2013

(86) PCT No.: PCT/EP2013/057799
§ 371 (c)(1),
(2) Date: Dec. 14, 2014

(87) PCT Pub. No.: WO2013/185949
PCT Pub. Date: Dec. 19, 2013

(65) Prior Publication Data
US 2015/0167760 A1     Jun. 18, 2015

(30) Foreign Application Priority Data

Jun. 15, 2012  (DE) .................. 10 2012 210 133

(51) Int. Cl.
*F16F 15/03*     (2006.01)
*F16D 63/00*     (2006.01)
(Continued)

(52) U.S. Cl.
CPC .......... *F16D 63/002* (2013.01); *B24B 23/028* (2013.01); *B24B 55/00* (2013.01); *H02K 7/104* (2013.01); *H02K 7/145* (2013.01)

(58) Field of Classification Search
CPC ......... F16D 63/002; B60L 7/28; H02K 7/104; H02K 49/043; H02P 3/04; F16F 15/035; F16F 15/18; F16F 2222/06
(Continued)

(56) References Cited

U.S. PATENT DOCUMENTS 2,774,895 A    12/1956  Zuckermann
4,549,703 A *  10/1985  Atobe .............. A01K 89/01555
                                                    242/288
(Continued)

FOREIGN PATENT DOCUMENTS

CN    101244532 A    8/2008
CN    101254588 A    9/2008
(Continued)

OTHER PUBLICATIONS

International Search Report corresponding to PCT Application No. PCT/EP2013/057799, dated Aug. 1, 2013 (German and English language document) (5 pages).

*Primary Examiner* — Nicholas J Lane
(74) *Attorney, Agent, or Firm* — Maginot, Moore & Beck LLP

(57) ABSTRACT

A machine tool deceleration device, in particular a hand-held machine tool deceleration device, for a portable machine tool, includes at least one magnetic deceleration unit. The magnetic deceleration unit includes at least one movably mounted claw segment element that is configured to change at least one parameter of a magnetic field of the magnetic deceleration unit.

19 Claims, 6 Drawing Sheets

(51) Int. Cl.
*B24B 23/02* (2006.01)
*B24B 55/00* (2006.01)
*H02K 7/104* (2006.01)
*H02K 7/14* (2006.01)

(58) Field of Classification Search
USPC .......................................................... 188/267
See application file for complete search history.

(56) References Cited

U.S. PATENT DOCUMENTS

| | | | | |
|---|---|---|---|---|
| 4,561,605 A | * | 12/1985 | Nakajima | A01K 89/01555 188/267 |
| 4,612,469 A | * | 9/1986 | Muramatsu | H02K 49/046 310/105 |
| 5,143,183 A | * | 9/1992 | Kuwahara | H02K 49/043 188/158 |
| 5,238,095 A | * | 8/1993 | Pedu | H02K 49/065 188/267 |
| 7,584,685 B2 | * | 9/2009 | Crist | F16F 1/361 74/574.1 |
| 2004/0262105 A1 | * | 12/2004 | Li | B60T 13/586 188/267 |
| 2012/0055740 A1 | * | 3/2012 | Allington | A62B 1/08 182/231 |
| 2012/0132489 A1 | * | 5/2012 | Adams | B60K 17/22 188/155 |
| 2014/0034434 A1 | * | 2/2014 | Esenwein | B23Q 11/0092 188/267 |

FOREIGN PATENT DOCUMENTS

| | | | |
|---|---|---|---|
| DE | 196 36 873 A1 | 3/1998 | |
| DE | 199 32 578 A1 | 6/2000 | |
| DE | 10 2010 043 184 A1 | 5/2012 | |
| GB | 768518 A | * 2/1957 | .............. F41C 27/04 |

* cited by examiner (A-A)

(A-A)

MACHINE TOOL DECELERATION DEVICE

This application is a 35 U.S.C. §371 National Stage Application of PCT/EP2013/057799, filed on Apr. 15, 2013, which claims the benefit of priority to Serial No. DE 10 2012 210 133.0, filed on Jun. 15, 2012 in Germany, the disclosures of which are incorporated herein by reference in their entirety.

BACKGROUND

DE 199 32 578 B4 already discloses a machine tool braking apparatus of a portable machine tool, which machine tool braking apparatus has a magnetic field braking unit.

SUMMARY

The disclosure proceeds from a machine tool braking apparatus, in particular from a hand-held machine tool braking apparatus, of a portable machine tool, having at least one magnetic field braking unit.

It is proposed that the magnetic field braking unit has at least one movably mounted claw segment element for changing at least one characteristic variable of a magnetic field of the magnetic field braking unit. In this document, a "magnetic field braking unit" is intended to be understood to mean, in particular, a braking unit which uses a magnetic field to reduce and/or limit a speed, in particular a rotation speed, of a moving component, in particular of a rotating component, in comparison to a working speed at least substantially without friction, in particular in addition to purely friction-related reduction and/or limiting of the speed as a result of mounting of the component. In this document, "reduce and/or limit substantially without friction" is intended to be understood to mean, in particular, braking of a component which takes place without frictional forces, with the exception of bearing-related frictional forces and/or flow-related resistance forces. In particular, the component is braked by means of the magnetic field braking unit in a manner decoupled from a contact between the component and a friction lining of a braking element. In principle however, it is also feasible for a frictional braking unit which is coupled to or uncoupled from the magnetic field braking unit to be provided in addition to the at least substantially friction-free magnetic field braking unit. Furthermore, the magnetic field braking unit is, in particular, in the form of a magnetic field braking unit which is separate from a drive. In this document, a "magnetic field braking unit which is separate from a drive" is intended to be understood to mean a magnetic field braking unit which brakes a component by means of a magnetic field in a manner decoupled from a magnetic field of a drive unit, such as an electric motor for example. A stator and/or a rotor of the drive unit are preferably decoupled from the magnetic field of the magnetic field braking unit. The magnetic field braking unit is preferably provided for braking the component in a braking state of the magnetic field braking unit, in particular in a period of greater than 0.1 s, preferably greater than 0.5 s and particularly preferably less than 3 s starting from a working speed, in particular braking said component to a speed which is less than 50% of the working speed, is preferably less than 20% of the working speed, and particularly preferably to a speed of 0 m/s.

The magnetic field braking unit may be in the form of an assembly module. In this document, the expression "assembly module" is intended to define, in particular, a design of a unit in which a plurality of components are pre-mounted and the unit as a whole is mounted in an overall system, in particular in a portable machine tool. The assembly module preferably has at least one fastening element which is intended to connect the assembly module to the overall system in a releasable manner. The assembly module can advantageously be removed from the overall system in particular with less than 10 fastening elements, preferably with less than 8 fastening elements and particularly preferably with less than 5 fastening elements. The fastening elements are particularly preferably in the form of screws. However, it is also feasible for the fastening elements to be in the form of other elements which appear to be expedient to a person skilled in the art, such as quick-action clamping elements, fastening elements which can be operated without tools etc. for example. At least one function of the assembly module, in particular a change in the pole position of the permanent magnets for activating the magnetic field braking unit, can preferably be ensured in a state in which said assembly module is removed from the overall system. The assembly module can be removed particularly preferably by an end user. Therefore, the assembly module is in the form of a replaceable unit which can be replaced with a further assembly module, such as in the event of a defect in the assembly module or an extension of the functions and/or a change in the functions of the overall system for example.

In this document, the expression "movably mounted" is intended to define, in particular, mounting of a unit and/or of an element relative to at least one further unit and/or relative to a further element, wherein the unit and/or the element is able to move along at least one axis along a distance of greater than 1 mm, preferably greater than 10 mm and particularly preferably greater than 20 mm, and/or is able to move about at least one axis by an angle of greater than 10°, preferably greater than 45°, and particularly preferably greater than 60°, in particular in a manner decoupled from an elastic deformation of the unit and/or of the element and in a manner decoupled from abilities to move which are created by bearing play. In this case, the claw segment element is preferably mounted such that it can rotate about a movement axis of the claw segment element. The movement axis of the claw segment element preferably runs at least substantially parallel or coaxially to a rotation axis of an output drive element, in particular of a spindle, of an output drive unit of the portable machine tool. In this document, "substantially parallel" is intended to be understood to mean, in particular, orientation of a direction relative to a reference direction, in particular in one plane, wherein the direction exhibits a deviation in particular of less than 8°, advantageously less than 5° and particularly advantageously less than 2°, in relation to the reference direction. However, it is also feasible for the movement axis of the output drive element to have another orientation which appears to be expedient to a person skilled in the art In this document, the term "claw segment element" is intended to define, in particular, an element which has at least one magnetically permeable projection, which runs at least substantially parallel to the movement axis of the element, for changing a magnetic field, which projection has, as viewed along a direction which runs about the movement axis, an extent which is smaller than an overall extent of the element along the direction which runs about the movement axis. The claw segment element particularly preferably has a large number of projections which, as viewed along the direction which runs about the movement axis, are arranged on the claw segment element in a manner uniformly distributed or spaced apart relative to the following projection. In this case, in each case two projections which directly follow one another along the direction which runs about the movement axis can be separated from one another by an air gap or connected to one another by means of a magnetically impermeable connecting element, such as a plastic connecting element etc., for example. The claw segment element preferably comprises at least four projections which, for the most part, are separated from one another by air gaps along the direction which runs around the movement axis. However, it is also feasible for the claw segment element to have a number of projections which differs from four. The claw segment element is preferably different from a magnet element of the magnetic field braking unit, in particular from a permanent magnet of the magnetic field braking unit. Therefore, the magnetic field braking unit preferably comprises at least one claw segment element, which is different from a magnet element of the magnetic field braking unit, for changing at least one characteristic variable of a magnetic field of the magnetic field braking unit, which claw segment element is movably mounted. In this document, a "characteristic variable of a magnetic field" is intended to be understood to mean, in particular, a parameter which defines a magnetic field, such as a magnetic flux, a magnetic induction, a magnetic resistance, a magnet voltage, a magnetic return path etc. for example. In this document, the term "change" is intended to define, in particular, "set" and/or "influence". The claw segment element is preferably formed at least partially from a ferromagnetic material, such as iron, iron-cobalt and/or iron-nickel alloys for example. However, it is also feasible for the claw segment element to be formed entirely from a ferromagnetic material. The claw segment element is particularly preferably intended to change or to influence a profile of a magnetic flux or of a magnetic return path in at least one operating state or in at least one operating position. In this document, "intended" is intended to be understood to mean, in particular, specially designed and/or specially equipped. A change between a braking state and a freewheeling state of the magnetic field braking unit can be implemented in a structurally simple manner by means of the refinement according to the disclosure. As a result of a relative movement of the claw segment element, a magnetic return path of the magnetic field braking unit can advantageously be changed, and as a result an intensity of a braking magnetic field can be influenced. In addition, a compact machine tool braking apparatus can advantageously be obtained.

It is further proposed that the magnetic field braking unit comprises at least one further claw segment element for changing at least one characteristic variable of a magnetic field of the magnetic field braking unit. Therefore, the magnetic field braking unit preferably comprises at least one further claw segment element, which is different from a magnet element of the magnetic field braking unit, for changing at least one characteristic variable of a magnetic field of the magnetic field braking unit. The further claw segment element preferably has magnetically permeable projections. In this case, the further claw segment element is preferably at least partially formed from a ferromagnetic material, such as iron, iron-cobalt and/or iron-cobalt-nickel alloys for example. The further claw segment element is particularly preferably intended to change or to influence a profile of a magnetic flux or of a magnetic return path in at least one operating state or in at least one operating position by means of interaction with the claw segment element. The claw segment element and the further claw segment element can preferably be moved relative to one another in at least one operating state. The further claw segment element is preferably movably mounted. In this case, the further claw segment element can preferably be moved together with the claw segment element in at least one operating state. A large magnetic return path area which allows advantageous braking of a moving component by means of the magnetic field unit can advantageously be obtained in at least one operating state, in particular in a braking state, of the magnetic field braking unit by means of the refinement according to the disclosure.

It is further proposed that the claw segment element and the further claw segment element can be moved relative to one another in at least one operating state. The claw segment element and the further claw segment element can preferably be rotated relative to one another in a transition state of the magnetic field braking unit starting from a freewheeling state of the magnetic field braking unit into a braking state of the magnetic field braking unit. Furthermore, the claw segment element and the further claw segment element can preferably be rotated relative to one another in a transition state of the magnetic field braking unit starting from a braking state of the magnetic field braking unit into a freewheeling state of the magnetic field braking unit. The machine tool braking apparatus comprises at least one mechanical activation unit for moving the claw segment element and the further claw segment element relative to one another. In this document, a "mechanical activation unit" is intended to mean, in particular, a unit which, as a result of a relative movement, initiates a tripping process and/or an activation process, in particular of the magnetic field braking unit, wherein the relative movement differs from a pure switching movement of a switching element for generating an electrical signal and is formed, in particular, by a movement of a magnet element and/or by an inertia-related movement, in particular by an inertia-related movement of a rotating drive element, output drive element and/or of an operating tool. In this connection, a "tripping process" is intended to be understood to mean, in particular, mechanical, electrical, magnetic and/or electronic signaling of a state which is intended to initiate an activation process. In this document, an "activation process" is intended to be understood to mean, in particular, mechanical, electrical, magnetic and/or electronic activation of the magnetic field braking unit for generating forces and/or torques for braking a component.

In a preferred embodiment of the machine tool braking apparatus according to the disclosure, the activation unit is intended to initiate the tripping process and the activation process as a result of the relative movement, in particular at least substantially without a time delay. In this case, the activation unit can be intended to signal, for example, a tripping process and to initiate an activation process of the magnetic field braking unit at least substantially at the same time as a result of the relative movement. A refinement of the mechanical activation unit in which a switch is operated by the relative movement as the tripping process and an activation process which follows the tripping process is initiated by means of an actuator and/or a spring force and/or by means of other operating elements which appear to be expedient to a person skilled in the art is likewise feasible. Furthermore, it is likewise feasible for the activation unit to comprise a sensor unit which senses the relative movement and, as a result of this, initiates a tripping process, wherein the activation process is initiated, for example, by means of an actuator.

A further inventive refinement of the machine tool braking apparatus may involve the activation unit being mechanically, electrically, magnetically and/or electronically connected to a solenoid of the magnetic field braking unit, wherein the solenoid is intended to influence a magnetic field of the magnetic field braking unit in at least one operating mode. The solenoid can generate an additional magnetic field to an existing magnetic field of the magnetic field braking unit. In this case, it is feasible for the additional magnetic field to at least partially compensate for at least magnetic forces of the existing magnetic field of the magnetic field braking unit in a working mode and/or to at least partially attenuate said magnetic forces at least in comparison to an intensity of the magnetic force of the magnetic field in a braking mode. The solenoid of the magnetic field braking unit can advantageously likewise be intended to allow an additional torque for achieving a working rotation speed of the drive unit in a short period of time, such as preferably for achieving boost operation, during run-up of a drive unit of the portable machine tool in an operating mode. Reliable tripping and/or activation of the magnetic field braking unit can advantageously be obtained by means of the mechanical activation unit. Furthermore, in a preferred embodiment of the machine tool braking apparatus according to the disclosure, electrical components for tripping and/or activating the magnetic field braking unit can advantageously be dispensed with. As a result, the susceptibility of the magnetic field braking unit to faults can advantageously be kept low. A switching process for switching between a braking state of the magnetic field braking unit and a freewheeling state of the magnetic field braking unit can be implemented in a structurally simple manner by means of the two claw segment elements which move relative to one another in at least one operating state.

It is further proposed that the magnetic field braking unit comprises at least one eddy current element which, as viewed along a direction which runs at least substantially perpendicular to a movement axis of the claw segment element, is arranged between the claw segment element and the further claw segment element in at least one operating state. In this document, the expression "arranged between" is intended to be understood to mean, in particular, a physical arrangement in which components are arranged one behind the other at least along a straight line and, as viewed along the straight line, at least partially overlap or the straight line intersects the components. As viewed along the direction which runs at least substantially perpendicular to a movement axis of the claw segment element, the eddy current element is preferably arranged between the claw segment element and the further claw segment element at least in a braking state of the magnetic field braking unit. Therefore, a high braking force for braking at least one moving component can advantageously be obtained in at least one operating state, in particular a braking state, of the magnetic field braking unit.

In addition, it is proposed that the magnetic field braking unit comprises at least one eddy current element which is arranged on a return path element of the magnetic field braking unit. In this document, an "eddy current element" is intended to be understood to mean, in particular, an element which is intended to generate a magnetic field for braking at least one moving component as a result of eddy currents. Friction-free braking of a moving component can advantageously be implemented in this way.

Furthermore, it is proposed that the magnetic field braking unit has at least one braking element which is stationary relative to a gear mechanism housing and is in the form of a permanent magnet. A compact magnetic field braking unit can advantageously be obtained in this way. An output drive element can advantageously be designed to be decoupled from a weight of the braking element in the event of rotation.

It is further proposed that the magnetic field braking unit has at least one braking element which is in the form of a permanent magnet. However, it is also feasible for the magnetic field braking unit to have, in an alternative refinement, a braking element, which is in the form of a coil, for generating a magnetic field. The braking element, which is in the form of a permanent magnet, is preferably in the form of a rare-earth magnet, such as a rare-earth magnet comprising hard ferrite, neodymium-iron-boron (NdFeB), samarium-cobalt (SmCo) etc. for example. However, it is also feasible for the permanent magnet to be formed from another material which appears to be expedient to a person skilled in the art. The permanent magnet is preferably in the form of a ring. Furthermore, the permanent magnet preferably has an inner magnetic field which runs along a direction which runs at least substantially parallel to the movement axis of the claw segment element. The braking element, which is in the form of a permanent magnet, is preferably in the form of an axially magnetized magnet. A magnetic field braking unit can be obtained in a structurally simple manner. Furthermore, a magnetic field braking unit which is independent of a voltage supply can advantageously be obtained. Therefore, a high degree of functional reliability can advantageously be achieved since the magnetic field braking unit is advantageously functional without separately supplied electrical energy.

In an advantageous refinement of the machine tool braking apparatus according to the disclosure, the braking element is connected in a rotationally fixed manner to a further claw segment element of the magnetic field braking unit. "In a rotationally fixed manner" is intended to be understood to mean, in particular, a connection which transfers a torque and/or a rotary movement in an at least substantially unchanged manner. In this document, "transfer in an at least substantially unchanged manner" is intended to be understood to mean, in particular, complete transmission of forces and/or torques from one component to a further component, apart from a loss as a result of friction and/or of tolerances. The braking element is particularly preferably firmly fixed to the further claw segment element. In this case, the braking element can be fixed to the further claw segment element by means of an interlocking, force-fitting and/or cohesive connection. The braking element is preferably fixed to the further claw segment element by means of a cohesive connection, in particular by means of adhesive bonding. An installation space-saving arrangement of the braking element can advantageously be obtained by means of the refinement according to the disclosure.

In an alternative refinement of the machine tool braking apparatus according to the disclosure, the braking element is connected to an eddy current element of the magnetic field braking unit by means of a return path element of the magnetic field braking unit. In this case, the braking element can be fixed to the return path element by means of an interlocking, force-fitting and/or cohesive connection. The braking element is preferably fixed to the return path element by means of a cohesive connection, in particular by means of adhesive bonding.

In addition, the eddy current element is preferably fixed to the return path element by means of a cohesive connection, in particular by means of adhesive bonding. However, it is also feasible for the eddy current element to be fixed to the return path element by means of another connection which appears to be expedient to a person skilled in the art, such as by means of an interlocking connection and/or by means of a cohesive connection for example. An advantageous magnetic return path for braking a moving component can be implemented in at least one operating state by means of the refinement according to the disclosure.

The disclosure further proceeds from a portable machine tool, in particular from a portable hand-held machine tool, having a machine tool braking apparatus according to the disclosure, in particular having a hand-held machine tool braking apparatus. In this document, a "portable machine tool" is intended to be understood to mean, in particular, a machine tool, in particular a hand-held machine tool, which can be transported by an operator without a transportation machine. The portable machine tool has, in particular, a mass which is less than 50 kg, preferably less than 20 kg and particularly preferably less than 10 kg. In this case, the portable machine tool may be in the form of an angle grinder, a drill, a hand-held circular saw, a chipping hammer and/or a percussion drill etc. The portable machine tool is particularly preferably in the form of an angle grinder. A safety function for an operator of the portable machine tool can advantageously be obtained, it advantageously being possible for a risk of injury to an operator to be kept low by said safety function.

In addition, it is proposed that the portable machine tool has at least one output drive unit which comprises at least one output drive element on which the claw segment element is arranged in a rotationally fixed manner. In this document, an "output drive unit" is intended to be understood to mean, in particular, a unit which can be driven by means of a drive unit and transmits forces and/or torques which are generated by the drive unit to a processing tool. The output drive unit is preferably in the form of an angular gear mechanism. However, it is also feasible for the output drive unit to have another design which appears to be expedient to a person skilled in the art, such as a design in the form of a worm gear mechanism, in the form of a toothed belt mechanism, in the form of a planetary gear mechanism etc. for example. In addition, it is likewise feasible for the magnetic field braking unit to be arranged on a drive unit of the portable machine tool. The refinement according to the disclosure advantageously allows a compact arrangement of the machine tool braking apparatus on the portable machine tool.

The machine tool braking apparatus according to the disclosure and the portable machine tool according to the disclosure are not intended to be limited to the above-described application and embodiment in this case. In particular, the machine tool braking apparatus according to the disclosure and the portable machine tool according to the disclosure for fulfilling a manner of operation described in this document can have a number of individual elements, components and units which differs from the number cited in this document.

BRIEF DESCRIPTION OF THE DRAWINGS

Further advantages can be gathered from the following description of the drawings. The drawings illustrate exemplary embodiments of the disclosure. The drawings, the description and the claims contain numerous features in combination. A person skilled in the art will expediently consider the features on their own and combine said features to form expedient further combinations.

In the drawings.

DETAILED DESCRIPTION

Figure 1:
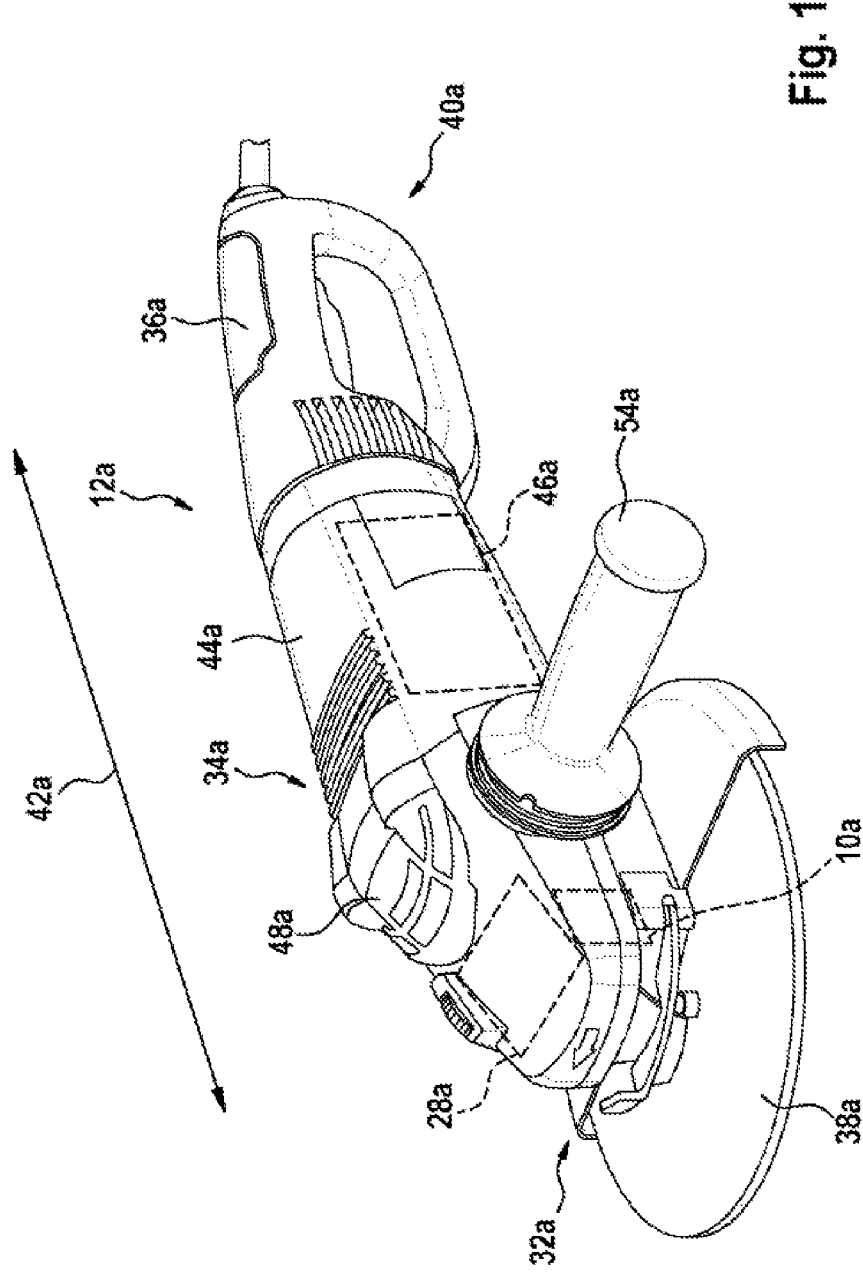
FIG. 1 shows a schematic illustration of a machine tool according to the disclosure having a machine tool braking apparatus according to the disclosure.
Figure 2:
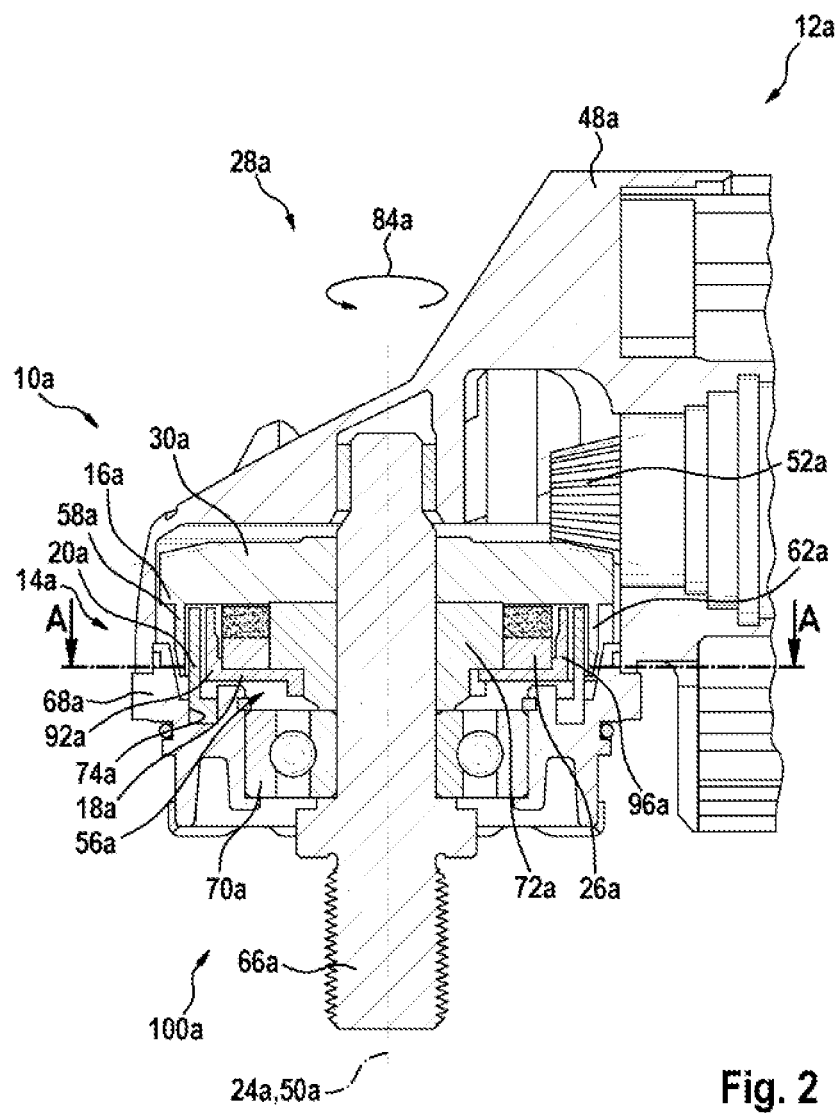
FIG. 2 shows a schematic illustration of a view of a detail of the machine tool braking apparatus according to the disclosure from FIG. 1.

FIG. 1 shows a portable machine tool 12a, which is in the form of an angle grinder, having a machine tool braking apparatus 10a. The angle grinder comprises a protective hood unit 32a, a machine tool housing 34a and a main handle 36a which extends in the direction of a main direction 42a of extent of the portable machine tool 12a on a side 40a of the machine tool housing 34a which is averted from a processing tool 38a. In this case, the processing tool 38a is in the form of a grinding disk. However, it is also feasible for the processing tool 38a to be in the form of a cutting disk or polishing disk. The machine tool housing 34a comprises a motor housing 44a for accommodating a drive unit 46a of the portable machine tool 12a and a gear mechanism housing 48a for accommodating an output drive unit 28a of the portable machine tool 12a. The drive unit 46a is intended to drive the processing tool 38a in a rotatable manner by means of the output drive unit 28a. The output drive unit 28a is connected to the drive unit 46a by means of a drive element 52a of the drive unit 46a, which drive element is driven in a rotating manner about a rotation axis. The drive element 52a is in the form of an armature shaft (FIG. 2). Furthermore, the output drive unit 28a comprises a spindle 66a which can rotate about a rotation axis 50a, a bearing flange 68a and a bearing element 70a, which is arranged in the bearing flange 68a, for bearing the spindle 66a. The bearing flange 68a is connected in a releasable manner to the gear mechanism housing 48a by means of fastening elements (not illustrated in any detail here) of the output drive unit 28a. Furthermore, the processing tool 38a can be connected in a rotationally fixed manner to the spindle 66a by means of a fastening element (not illustrated in any detail here) for processing a workpiece. The processing tool 38a can therefore be driven in a rotatable manner during operation of the portable machine tool 12a. Furthermore, an auxiliary handle 54a is arranged on the gear mechanism housing 48a. The auxiliary handle 54a extends transverse to the main direction 42a of extent of the portable machine tool 12a.

Figure 4:
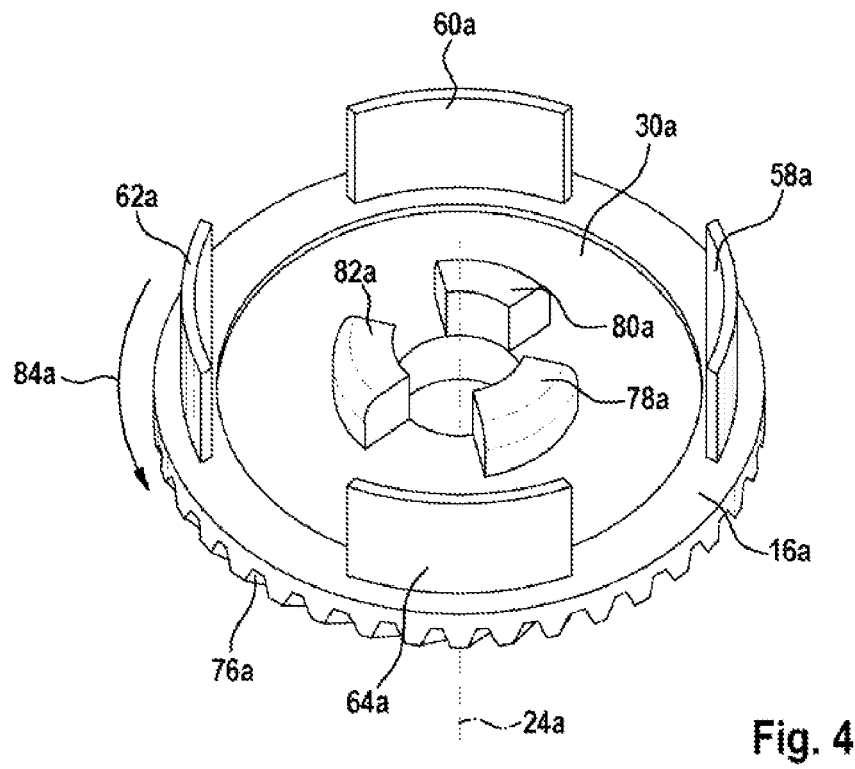
FIG. 4 shows a schematic illustration of a view of a detail of an output drive element of an output drive unit of the portable machine tool according to the disclosure.

The machine tool braking apparatus 10a is arranged in the gear mechanism housing 48a of the portable machine tool 12a. In this case, the machine tool braking apparatus 10a has at least one magnetic field braking unit 14a (FIG. 2). The magnetic field braking unit 14a comprises at least one movably mounted claw segment element 16a for changing at least one characteristic variable of a magnetic field of the magnetic field braking unit 14a. The claw segment element 16a is arranged in a rotationally fixed manner on an output drive element 30a of the output drive unit 28a. In this case, the claw segment element 16a is integrally formed with the output drive element 30a (FIGS. 2 and 4). The output drive element 30a is therefore formed from a magnetically permeable material, such as a ferromagnetic material for example, in order to change at least one characteristic variable of a magnetic field of the magnetic field braking unit 14a. The output drive element 30a is in the form of a crown gear. In this case, the output drive element 30a is arranged on the spindle 66a of the output drive unit 28a by means of a clearance fit. The output drive unit 28a has at least one driver element 72a for transmitting torque between the spindle 66a and the output drive element 30a. The driver element 72a is connected in a rotationally fixed manner to the spindle 66a. In this case, the driver element 72a can be connected in a rotationally fixed manner to the spindle 66a by means of an interlocking, force-fitting and/or cohesive connection in a manner which is already known to a person skilled in the art.

The output drive element 30a has three rotary driver projections 78a, 80a, 82a on a side of the output drive element 30a which is averted from a tooth system 76a of the output drive element 30a in order to couple the output drive element 30a and the driver element 72a in a rotationally fixed manner (FIG. 4). However, it is also feasible for the output drive element 30a to have a number of rotary driver projections 78a, 80a, 82a which differs from three. A person skilled in the art will provide a suitable number of rotary driver projections 78a, 80a, 82a on the output drive element 30a depending on the field of application. The rotary driver projections 78a, 80a, 82a are arranged on that side of the output drive element 30a which is averted from the tooth system 76a in a manner distributed uniformly along a circumferential direction 84a. In this case, the circumferential direction 84a runs in a plane which extends at least substantially perpendicular to the rotation axis 50a of the spindle 66a or of the output drive element 30a. Furthermore, the rotary driver projections 78a, 80a, 82a extend perpendicular to that side of the output drive element 30a which is averted from the tooth system 76a. The rotary driver projections 78a, 80a, 82a extend in the direction of the driver element 72a in a mounted state of the output drive unit 28a.

Figure 5:
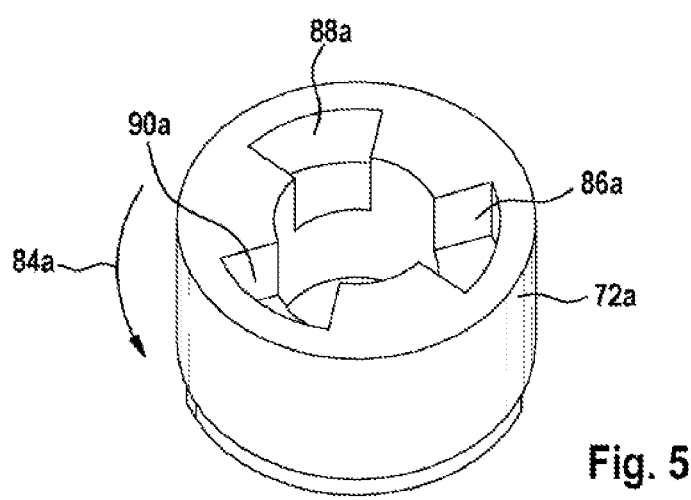
FIG. 5 shows a schematic illustration of a view of a detail of a driver element of an activation unit of the machine tool braking apparatus according to the disclosure.

FIG. 5 shows a view of a detail of the driver element 72a. The driver element 72a has rotary driver recesses 86a, 88a, 90a for receiving the rotary driver projections 78a, 80a, 82a (FIG. 5). Therefore, in a mounted state, the rotary driver projections 78a, 80a, 82a extend along the rotation axis 50a of the spindle 66a into the rotary driver recesses 86a, 88a, 90a. The rotary driver recesses 86a, 88a, 90a are arranged on the driver element 72a in a manner distributed uniformly along the circumferential direction 84a.

Figure 6:
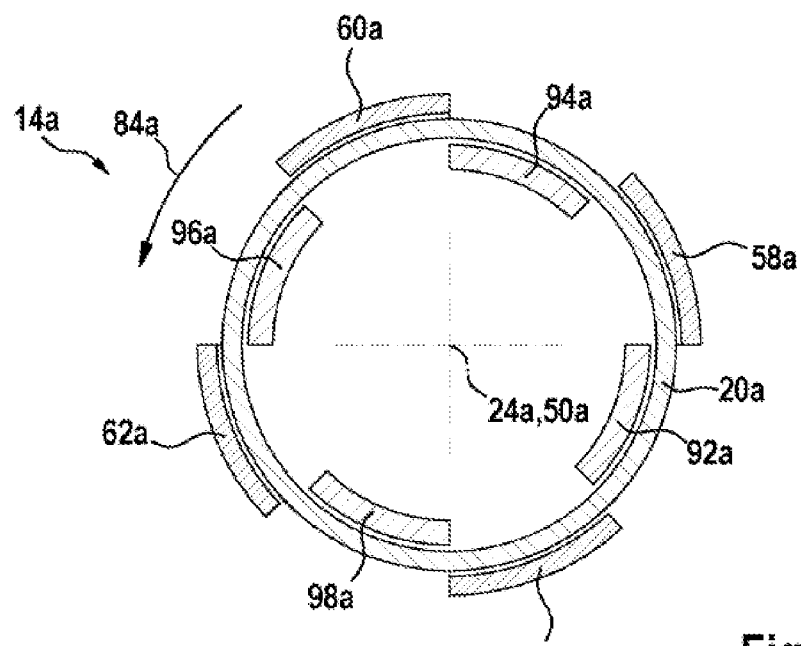
FIG. 6 shows a schematic illustration of a sectional view of the magnetic field braking unit in a freewheeling state along line A-A from FIG. 2.
Figure 7:
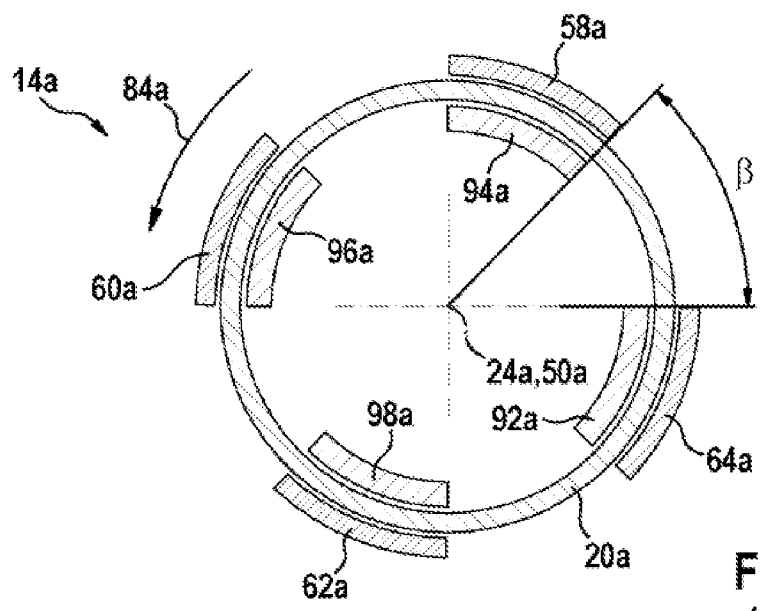
FIG. 7 shows a schematic illustration of a sectional view of the magnetic field braking unit in a braking state along line A-A from FIG. 2.

Furthermore, the rotary driver recesses 86a, 88a, 90a have an extent which is greater than that of the rotary driver projections 78a, 80a, 82a along the circumferential direction 84a. This results in rotary play being obtained between the output drive element 30a and the driver element 72a along the circumferential direction 84a. The rotary play is formed by an angular range around which the output drive element 30a can be rotated relative to the driver element 72a about the rotation axis 50a of the spindle 66a. The angular range is in this case formed by a distance between projections 58a, 60a, 62a, 64a of the claw segment element 16a which directly follow one another along the circumferential direction 84a, as viewed along the circumferential direction 84a (FIGS. 6 and 7). The rotary driver projections 78a, 80a, 82a can therefore be moved along the circumferential direction 84a in the rotary driver recesses 86a, 88a, 90a relative to edge regions of the rotary driver recesses 86a, 88a, 90a. The driver element 72a couples the output drive element 30a to the spindle 66a in a rotationally fixed manner when the rotary driver projections 78a, 80a, 82a bear against edge regions of the rotary driver recesses 86a, 88a, 90a. However, it is also feasible for the rotary driver projections 78a, 80a, 82a to be arranged on the driver element 72a and for the rotary driver recesses 86a, 88a, 90a to be arranged on the output drive element 30a. The rotary driver projections 78a, 80a, 82a of the output drive element 30a and the rotary driver recesses 86a, 88a, 90a of the driver element 72a form a mechanical activation unit 56a of the machine tool braking apparatus 10a. The activation unit 56a is intended to switch the magnetic field braking unit 14a from a braking state to a freewheeling state, and vice versa.

Furthermore, the magnetic field braking unit 14a has at least one further claw segment element 18a for changing at least one characteristic variable of a magnetic field of the magnetic field braking unit 14a. To this end, the further claw segment element 18a is formed from a ferromagnetic material. The further claw segment element 18a is fixed in a rotationally fixed manner to the driver element 72a. In this case, the driver element 72a is fixed in a rotationally fixed manner on the spindle 66a by means of a clearance fit. However, it is also feasible for the driver element 72a to be fixed in a rotationally fixed manner on the spindle 66a, for example by means of a screw connection, by means of a rivet connection, by means of an adhesive bonding connection, by means of a welded connection, by means of a feather key connection etc. The driver element 72a is formed from a magnetically impermeable material, such as stainless steel, plastic etc. for example, for the purpose of magnetic insulation. However, it is also feasible to arrange an insulation element between the output drive element 30a and the driver element 72a and/or the spindle 66a. The insulation element can be in the form of, for example, a Teflon sliding bushing etc., which mounts the output drive element 30a on the spindle 66a. The claw segment element 16a and the further claw segment element 18a are intended to change at least one characteristic variable of a magnetic field of the magnetic field braking unit 14a by means of interaction. In this case, the activation unit 56a is intended to move the claw segment element 16a and the further claw segment element 18a relative to one another in at least one operating state. Therefore, the claw segment element 16a and the further claw segment element 18a can be moved relative to one another in at least one operating state. The further claw segment element 18a is fixed to the driver element 72a in a rotationally fixed manner.

The claw segment element 16a has the four projections 58a, 60a, 62a, 64a for changing at least one characteristic variable of a magnetic field of the magnetic field braking unit 14a. However, it is also feasible for the claw segment element 16a to have a number of projections 58a, 60a, 62a, 64a which differs from four. The projections 58a, 60a, 62a, 64a of the claw segment element 16a are arranged on the claw segment element 16a in a manner spaced apart relative to one another along the circumferential direction 84a. In addition, the projections 58a, 60a, 62a, 64a of the claw segment element 16a are arranged on the claw segment element 16a in a manner uniformly distributed along the circumferential direction 84a. The further claw segment element 18a likewise comprises four projections 92a, 94a, 96a, 98a (FIGS. 6 and 7). The projections 92a, 94a, 96a, 98a of the further claw segment element 18a are arranged on the further claw segment element 18a in a manner uniformly distributed along the circumferential direction 84a. In addition, the projections 92a, 94a, 96a, 98a of the further claw segment element 18a are arranged on the further claw segment element 18a in a manner spaced apart relative to one another along the circumferential direction 84a. In a mounted state of the claw segment element 16a and of the further claw segment element 18a, the projections 92a, 94a, 96a, 98a of the further claw segment element 18a extend at least substantially parallel to the rotation axis 50a of the spindle 66a in the direction of the claw segment element 16a. The projections 58a, 60a, 62a, 64a of the claw segment element 16a extend at least substantially parallel to the rotation axis 50a of the spindle 66a in the direction of the further claw segment element 18a in a mounted state.

Furthermore, the magnetic field braking unit 14a comprises at least one eddy current element 20a which is arranged between the claw segment element 16a and the further claw segment element 18a of the magnetic field braking unit 14a, as viewed along a direction which runs at least substantially perpendicular to a movement axis 24a of the claw segment element 16a, in at least one operating state. The eddy current element 20a is formed from an electrically conductive material, such as aluminum and/or copper for example. The movement axis 24a of the claw segment element 16a which is integrally formed with the output drive element 30a runs coaxially to the rotation axis 50a of the spindle 66a in this case. The eddy current element 20a is in the form of a ring. In addition, the eddy current element 20a is fixed on the bearing flange 68a of the output drive unit 28a. In this case, the eddy current element 20a is fixed in a force-fitting and/or interlocking manner on the bearing flange 68a in a ring-like recess 74a of the bearing flange 68a. The ring-like recess 74a is in the form of an annular groove which runs along the circumferential direction 84a. Therefore, the claw segment element 16a and the further claw segment element 18a are moved relative to the eddy current element 20a by means of the spindle 66a during operation of the portable machine tool 12a.

Furthermore, the magnetic field braking unit 14a has at least one braking element 26a which is in the form of a permanent magnet. The braking element 26a is connected in a rotationally fixed manner to the further claw segment element 18a of the magnetic field braking unit 14a. Therefore, the braking element 26a is connected in a rotationally fixed manner to the driver element 72a. The braking element 26a is arranged between the projections 92a, 94a, 96a, 98a of the further claw segment element 18a and the driver element 72a, as viewed along the direction which runs at least substantially perpendicular to the movement axis 24a of the claw segment element 16a. In addition, the braking element 26a exhibits axial magnetization which is oriented, as viewed along an at least substantially parallel to the rotation axis 50a of the spindle 66a. One side of the braking element 26a forms a magnetic north pole of the braking element 26a, and one side of the braking element 26a forms a magnetic south pole of the braking element 26a. The braking element 26a is therefore in the form of an axially magnetized permanent magnet, with respect to the rotation axis 50a of the spindle 66a. In addition, it is also feasible for the magnetic field braking unit 14a to have a large number of braking elements 26a which are in the form of permanent magnets.

The machine tool braking apparatus 10a is in a braking mode in an idle state of the portable machine tool 12a in which no current is supplied to the electric motor unit of the drive unit 46a. The magnetic field braking unit 14a is therefore in a braking state. In the braking state of the magnetic field braking unit 14a, the projections 92a, 94a, 96a, 98a of the further claw segment element 18a and the projections 58a, 60a, 62a, 64a of the claw segment element 16a are situated opposite one another, as viewed along a direction which runs at least substantially perpendicular to the rotation axis 50a of the spindle 66a. A straight line which runs at least substantially perpendicular to the rotation axis 50a of the spindle 66a intersects at least one of the projections 92a, 94a, 96a, 98a of the further claw segment element 18a, the eddy current element 20a and at least one of the projections 58a, 60a, 62a, 64a of the claw segment element 16a in a braking state of the magnetic field braking unit 14a. Therefore, the projections 58a, 60a, 62a, 64a of the claw segment element 16a, the eddy current element 20a and the projections 92a, 94a, 96a, 98a of the further claw segment element 18a overlap as viewed along the direction which runs at least substantially perpendicular to the rotation axis 50a of the spindle 66a (FIG. 7). In this case, it is feasible for the magnetic field braking unit 14a to have at least one spring element, for a spring force to be applied to the claw segment element 16a and/or the further claw segment element 18a in the direction of a braking position in which the projections 58a, 60a, 62a, 64a of the claw segment element 16a and the projections 92a, 94a, 96a, 98a of the further claw segment element 18a overlap. This could result in automatic or supporting movement of the claw segment element 16a and/or of the further claw segment element 18a to a braking position when a torque of the electric motor unit of the drive unit 46a drops.

Figure 3:
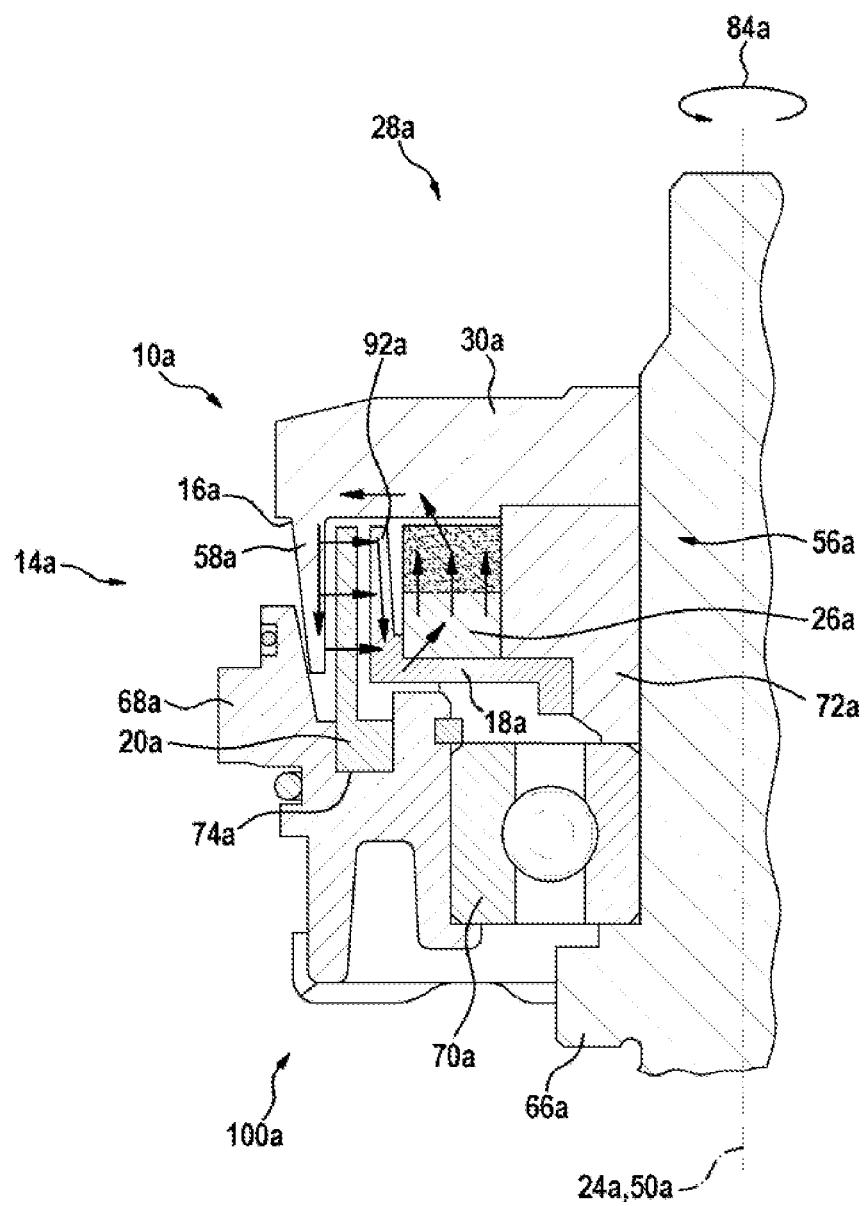
FIG. 3 shows a schematic illustration of a view of a detail of a magnetic flux profile of a magnetic field braking unit of the machine tool braking apparatus according to the disclosure.

In this case, a magnetic flux of the magnetic field braking unit 14a or of the braking element 26a which is in the form of a permanent magnet runs, starting from the braking element 26a, along a direction which runs at least substantially parallel to the rotation axis 50a of the spindle 66a, across an air gap, into the output drive element 30a. From the output drive element 30a, the magnetic flux in the output drive element 30a runs to the projections 58a, 60a, 62a, 64a of the claw segment element 16a. The magnetic flux runs further across an air gap into the eddy current element 20a. In this case, the magnetic flux enters the eddy current element 20a along a direction which runs at least substantially perpendicular to the rotation axis 50a of the spindle 66a. Starting from the eddy current element 20a, the magnetic flux runs across an air gap into the projections 92a, 94a, 96a, 98a of the further claw segment element 18a. The flux exits the eddy current element 20a along the direction which runs at least substantially perpendicular to the rotation axis 50a of the spindle 66a, and enters the projections 92a, 94a, 96a, 98a of the further claw segment element 18a. From the projections 92a, 94a, 96a, 98a of the further claw segment element 18a, the magnetic flux runs, across the further claw segment element 18a, back to the braking element 26a (FIG. 3).

When the portable machine tool 12a is started up by current being supplied to the electric motor unit of the drive unit 46a, the output drive element 30a is driven by the drive element 52a. In this case, the output drive element 30a is rotated about the rotation axis 50a of the spindle 66a relative to the driver element 72a until the rotary driver projections 78a, 80a, 82a bear against edge regions of the rotary driver recesses 86a, 88a, 90a. As a result, the output drive element 30a is coupled to the spindle 66a in a rotationally fixed manner. The spindle 66a is consequently driven in rotation. The processing tool 38a which is fastened to the spindle 66a is therefore likewise driven in rotation. As a result of the relative movement between the output drive element 30a and the driver element 72a, the claw segment element 16a is rotated relative to the further claw segment element 18a. As a result, the magnetic field braking unit 14a is switched to a freewheeling state in which low magnetic forces of the brake element 26a, which is in the form of a permanent magnet, act on the eddy current element 20a. As a result of the relative movement between the claw segment element 16a and the further claw segment element 18a, the projections 58a, 60a, 62a, 64a of the claw segment element 16a are rotated about the movement axis 24a of the claw segment element 16a relative to the projections 92a, 94a, 96a, 98a of the further claw segment element 18a. As a result, overlapping of the projections 58a, 60a, 62a, 64a of the claw segment element 16a and the projections 92a, 94a, 96a, 98a of the further claw segment element 18a along the direction which runs at least substantially perpendicular to the rotation axis 50a of the spindle 66a is removed (FIG. 6). A straight line which runs along the at least substantially perpendicular to the rotation axis 50a of the spindle 66a in this case intersects either one of the projections 58a, 60a, 62a, 64a of the claw segment element 16a and the eddy current element 20a or one of the projections 92a, 94a, 96a, 98a of the further claw segment element 18a and the eddy current element 20a.

When the portable machine tool 12a is switched off, the drive element 52a is braked by the electric motor unit of the drive unit 46a. The processing tool 38a which is fastened on the spindle 66a continues to rotate on account of a mass inertia. The spindle 66a is therefore likewise further rotated about the rotation axis 50a.

The processing tool 38a has larger moments of mass inertia than the drive element 52a and/or the losses in the drive element 52a during operation are higher than in the spindle 66a, for example on account of bearing losses, power consumption by a fan of the drive unit 46a. The drive element 52a therefore brakes the output drive element 30a. The output drive element 30a is rotated about the rotation axis 50a of the spindle 66a relative to the driver element 72a until the rotary driver projections 78a, 80a, 82a bear against edge regions of the rotary driver recesses 86a, 88a, 90a. The magnetic field braking unit 14a is therefore switched, starting from a freewheeling state, to a braking state. As a result, the claw segment element 16a is rotated relative to the further claw segment element 18a on account of a relative movement between the output drive element 30a and the driver element 72a. In this case, the projections 58a, 60a, 62a, 64a of the claw segment element 16a are rotated relative to the projections 92a, 94a, 96a, 98a of the further claw segment element 18a until the projections 58a, 60a, 62a, 64a of the claw segment element 16a are opposite the projections 92a, 94a, 96a, 98a of the further claw segment element 18a. Eddy currents are produced in the stationary eddy current element 20a on account of a relative movement between the projections 58a, 60a, 62a, 64a of the claw segment element 16a and the projections 92a, 94a, 96a, 98a of the further claw segment element 18a. The eddy currents generate a magnetic flux in a perpendicular and eddying manner in relation to a magnetic flux of the magnetic field braking unit 14a. Therefore, a magnetic field which opposes a magnetic field of the braking element 26a which is in the form of a permanent magnet is generated in the eddy current element 20a. This generates a braking torque which brakes the claw segment element 16a which rotates with the spindle 66a relative to the eddy current element 20a and the further claw segment element 18a which rotates with the spindle 66a relative to the eddy current element 20a. The spindle 66a and the processing tool 38a are likewise braked. The claw segment element 16a and the further claw segment element 18a are therefore intended to change or to influence at least one profile of a magnetic flux of a magnetic field of the magnetic field braking unit 14a by means of interaction.

Furthermore, the magnetic field braking unit 14a, together with the output drive unit 28a, is in the form of an assembly module 100a (FIG. 2). The assembly module 100a comprises four fastening elements (not illustrated here) which are in the form of screws. The screws are intended to connect the assembly module 100a to the gear mechanism housing 48a in a releasable manner. An operator can remove the assembly module 100a from the gear mechanism housing 48a as required and replace it with a further assembly module, not illustrated in any detail here, which is decoupled from a magnetic field braking unit and comprises only an output drive unit. The further assembly module can therefore be mounted on the gear mechanism housing 48a by the operator as an alternative to the assembly module 100a. An operator therefore has the option of equipping the portable machine tool 12a with the assembly module 100a having the magnetic field braking unit 14a and the output drive unit 28a, or with the further assembly module having a drive unit. For an application in which the portable machine tool 12a is intended to be operated in a manner uncoupled from the machine tool braking apparatus 10a, the assembly module 100a can be replaced by the further assembly module by an operator. To this end, the operator removes only the assembly module 100a from the gear mechanism housing 48a and mounts the further assembly module on the gear mechanism housing 48a.

Figure 8:
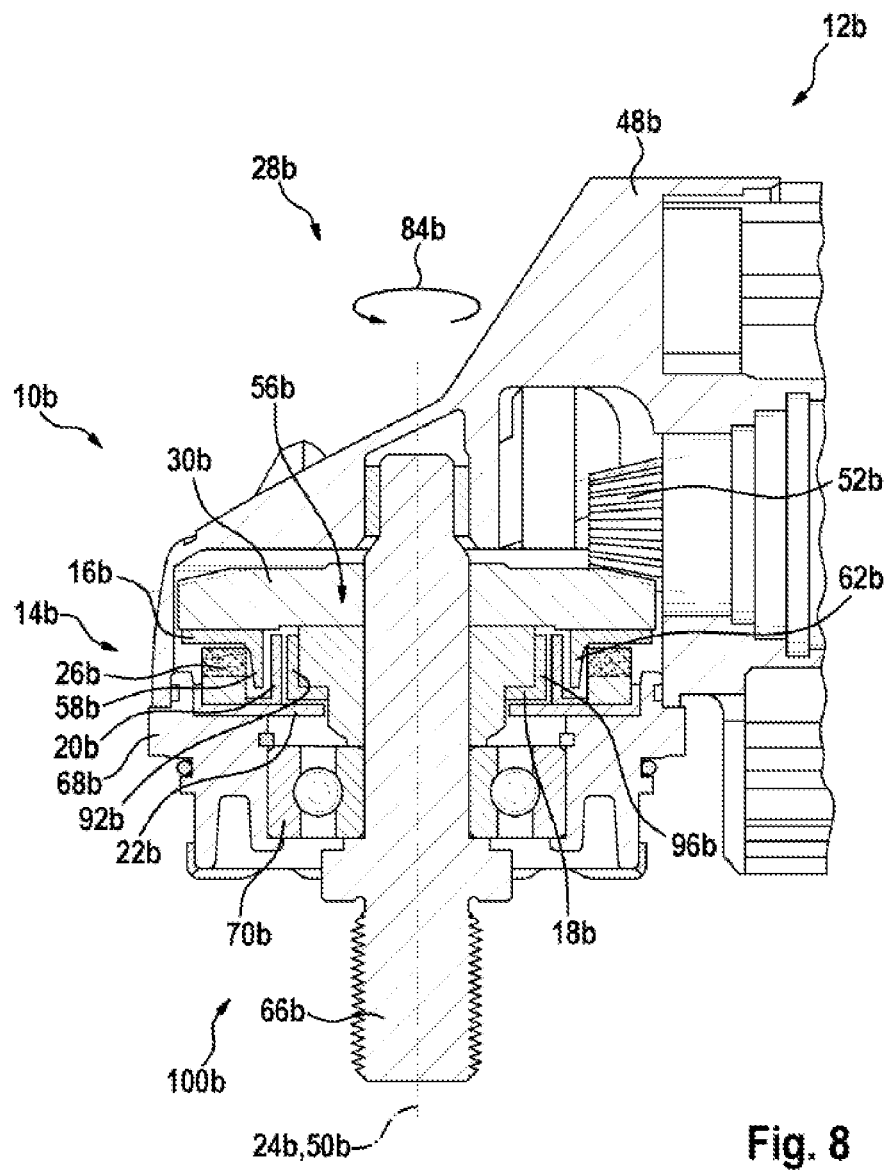
FIG. 8 shows a schematic illustration of a view of a detail of an alternative machine tool braking apparatus according to the disclosure.

FIG. 8 illustrates an alternative exemplary embodiment. Components, features and functions which remain substantially the same are denoted by the same reference symbols in principle. In order to distinguish between the exemplary embodiments, the letters a and b are added to the reference symbols of the exemplary embodiments. The following description is limited substantially to the differences from the first exemplary embodiment in FIGS. 1 to 6, wherein reference can be made to the description of the first exemplary embodiment in FIGS. 1 to 6 in respect of components, features and functions which remain the same.

FIG. 8 shows a machine tool braking apparatus 10b which is arranged, as an alternative, in a gear mechanism housing 48b of a portable machine tool 12b. The machine tool braking apparatus 10b comprises a magnetic field braking unit 14b which comprises at least one movably mounted claw segment element 16b for changing at least one characteristic variable of a magnetic field of the magnetic field braking unit 14b. The claw segment element 16b is fixed in a rotationally fixed manner to an output drive element 30b of an output drive unit 28b of the portable machine tool 12b. In this case, the claw segment element 16b is separated from the output drive element 30b and fixed in a rotationally fixed manner to the output drive element 30b by means of a type of connection which appears to be expedient to a person skilled in the art, such as by means of an adhesive bonding connection, by means of a screw connection, by means of a rivet connection etc. for example. Apart from fastening to the output drive element 30b, the claw segment element 16b is designed in at least substantially the same way as the claw segment element 16a which is described in FIGS. 1 to 7. The magnetic field braking unit 14b further comprises at least one further claw segment element 18b for changing at least one characteristic variable of a magnetic field of the magnetic field braking unit 14b. The further claw segment element 18*b* is fixed in a rotationally fixed manner to a driver element 72*b* of the output drive unit 28*b*. The further claw segment element 18*b* is designed in at least substantially the same way as the further claw segment element 18*a* which is described in FIGS. 1 to 7.

Furthermore, the magnetic field braking unit 14*b* comprises at least one eddy current element 20*b* which is arranged on a return path element 22*b* of the magnetic field braking unit 14*b*. The return path element 22*b* is intended to compress a magnetic field of the magnetic field braking unit 14*b* in the region of the magnetic field braking unit 14*b* and to keep stray flux low. In this case, the return path element 22*b* is fixed to a bearing flange 68*b* of the output drive unit 28*b*. The return path element 22*b* is in the form of a ring. The magnetic field braking unit 14*b* further comprises at least one eddy current element 20*b* which is arranged on the return path element 22*b* of the magnetic field braking unit 14*b*. In addition, the magnetic field braking unit 14*b* has at least one braking element 26*b* which is in the form of a permanent magnet. The braking element 26*b* is connected to the eddy current element 20*b* of the magnetic field braking unit 14*b* by means of the return path element 22*b* of the magnetic field braking unit 14*b*. Therefore, the claw segment element 16*b* and the further claw segment element 18*b* are moved relative to the braking element 26*b* during operation of the portable machine tool 12*b*.

The magnetic field braking unit 14*b* therefore has at least one braking element 26*b* which is stationary in relation to the gear mechanism housing 48*b* and is in the form of a permanent magnet.

A magnetic flux of the magnetic field braking unit 14*b* or of the braking element 26*b* which is in the form of a permanent magnet runs, starting from the braking element 26*b*, along a direction which runs at least substantially parallel to a rotation axis 50*b* of a spindle 66*b* of the output drive unit 28*b*, across an air gap, into the claw segment element 16*b*. From the claw segment element 16*b*, the magnetic flux in the claw segment element 16*b* runs to projections 58*b*, 62*b* of the claw segment element 16*b* (only two projections are illustrated in FIG. 8). The magnetic flux runs further across an air gap into the eddy current element 20*b*. In this case, the magnetic flux enters the eddy current element 20*b* along a direction which runs at least substantially perpendicular to the rotation axis 50*b* of the spindle 66*b*. Starting from the eddy current element 20*b*, the magnetic flux runs across an air gap into projections 92*b*, 96*b* of the further claw segment element 18*b* (only two projections are illustrated in FIG. 8). The flux exits the eddy current element 20*b* along the direction which runs at least substantially perpendicular to the rotation axis 50*b* of the spindle 66*b*, and enters the projections 92*b*, 96*b* of the further claw segment element 18*b*. From the projections 92*b*, 96*b* of the further claw segment element 18*b*, the magnetic flux runs across an air gap into the return path element 22*b* and back to the braking element 26*b*. Reference may be made to the machine tool braking apparatus 10*a* described in FIGS. 1 to 7 in respect of further features and functions of the machine tool braking apparatus 10*b*.

The invention claimed is:

1. A machine tool braking apparatus of a portable machine tool, comprising:
at least one magnetic field braking unit including at least one movably mounted claw segment element configured to change at least one characteristic variable of a magnetic field of the magnetic field braking unit and configured for movement relative to a housing of the portable machine tool about a rotation axis,
wherein the claw segment element includes a tooth system, a plurality of rotary driver projections, and a plurality of first claw projections extending in a direction of the rotation axis, the first claw projections spaced apart from each other in a circumferential direction defined by rotation of the claw segment element about the rotation axis.

2. The machine tool braking apparatus as claimed in claim 1, wherein:
the magnetic field braking unit comprises at least one further movably mounted claw segment element configured to change the at least one characteristic variable of the magnetic field of the magnetic field braking unit, and
the at least one further claw segment element includes a plurality of second claw projections extending in the direction of the rotation axis and spaced apart from each other in the circumferential direction.

3. The machine tool braking apparatus as claimed in claim 2, wherein:
the claw segment element and the further claw segment element are configured to be moved relative to one another about the rotation axis to a braking state and to a freewheeling state,
in the braking state the first claw projections at least partially overlap with the second claw projections in a direction extending at least substantially perpendicular to the direction of the rotation axis, and
in the freewheeling state the first claw projections are prevented from overlapping with the second claw projections in the direction extending at least substantially perpendicular to the direction of the rotation axis.

4. The machine tool braking apparatus as claimed in claim 2, wherein the magnetic field braking unit comprises at least one eddy current element arranged between the plurality of first claw projections and the plurality of second claw projections along a direction extending at least substantially perpendicular to the direction of the rotation axis.

5. The machine tool braking apparatus as claimed in claim 1, wherein the magnetic field braking unit comprises at least one eddy current element that is arranged on a return path element of the magnetic field braking unit.

6. The machine tool braking apparatus as claimed in claim 1, wherein the magnetic field braking unit has at least one braking element that is stationary relative to a gear mechanism housing and is in the form of a permanent magnet.

7. The machine tool braking apparatus as claimed in claim 1, wherein the magnetic field braking unit has at least one braking element configured as a permanent magnet.

8. The machine tool braking apparatus as claimed in claim 7, wherein the braking element is connected in a rotationally fixed manner to a further claw segment element of the magnetic field braking unit.

9. The machine tool braking apparatus at least as claimed in claim 6, wherein the braking element is connected to an eddy current element of the magnetic field braking unit by a return path element of the magnetic field braking unit.

10. A portable machine tool, comprising:
a housing; and
a machine tool braking apparatus including at least one magnetic field braking unit including at least one movably mounted claw segment element configured to change at least one characteristic variable of a magnetic field of the magnetic field braking unit and configured for movement relative to the housing about a rotation axis, wherein the claw segment element includes a tooth system, a plurality of rotary driver projections, and a plurality of first claw projections extending in a direction of the rotation axis, the first projections spaced apart from each other in a circumferential direction defined by rotation of the claw segment element about the rotation axis.

11. The portable machine tool as claimed in claim 10, further comprising:
at least one output drive unit including at least one output drive element on which the claw segment element is arranged in a rotationally fixed manner.

12. The machine tool braking apparatus as claimed in claim 1, wherein the machine tool braking apparatus is configured as a hand-held machine tool braking apparatus.

13. The portable machine tool as claimed in claim 10, wherein the portable machine tool is configured as a hand-held machine tool.

14. A machine tool braking apparatus of a portable machine tool, comprising:
a magnetic field braking unit including a first movably mounted claw segment element, a second moveably mounted claw segment, and only one permanent magnet braking element connected to only one of the first claw segment element and the second claw segment element,
wherein the first and second claw segment elements are each configured to change at least one characteristic variable of a magnetic field of the magnetic field braking unit,
wherein the first and second claw segment elements are each further configured for movement relative to a housing of the portable machine tool about a rotation axis, and
wherein the first claw segment element is configured for movement relative to the second claw segment element about the rotation axis.

15. The machine tool braking apparatus as claimed in claim 14, wherein:
the first claw segment element includes a tooth system, a plurality of rotary driver projections, and a plurality of first claw projections extending in a direction of the rotation axis, and
the first claw projections are spaced apart from each other in a circumferential direction defined by rotation of the first claw segment element about the rotation axis.

16. The machine tool braking apparatus as claimed in claim 15, wherein:
the second claw segment element includes a plurality of second claw projections extending in the direction of the rotation axis and spaced apart from each other in the circumferential direction.

17. The machine tool braking apparatus as claimed in claim 16, wherein:
the first and second claw segment elements are configured to be moved relative to one another about the rotation axis to a braking state and to a freewheeling state,
in the braking state the first claw projections at least partially overlap with the second claw projections in a direction extending at least substantially perpendicular to the direction of the rotation axis, and
in the freewheeling state the first claw projections are prevented from overlapping with the second claw projections in a direction extending at least substantially perpendicular to the direction of the rotation axis.

18. The machine tool braking apparatus as claimed in claim 16, wherein the magnetic field braking unit comprises at least one eddy current element arranged between the plurality of first claw projections and the plurality of second claw projections along a direction extending at least substantially perpendicular to the direction of the rotation axis.

19. The machine tool braking apparatus as claimed in claim 14, wherein the permanent magnet braking element generates only one magnetic field.

* * * * *